(12) United States Patent
Rizk et al.

(10) Patent No.: US 8,382,177 B2
(45) Date of Patent: Feb. 26, 2013

(54) QUICK-CHANGE FINGER FOR ROBOTIC GRIPPER

(75) Inventors: Nabil Michael Rizk, Salt Lake City, UT (US); Mark DeLouis, Pittsburgh, PA (US)

(73) Assignee: RE2, Inc., Pittsburgh, PA (US)

( * ) Notice: Subject to any disclaimer, the term of this patent is extended or adjusted under 35 U.S.C. 154(b) by 102 days.

(21) Appl. No.: 12/797,978

(22) Filed: Jun. 10, 2010

(65) Prior Publication Data

US 2010/0314895 A1 Dec. 16, 2010

Related U.S. Application Data

(60) Provisional application No. 61/268,352, filed on Jun. 11, 2009.

(51) Int. Cl.
*B66C 1/00* (2006.01)
*B66C 1/42* (2006.01)
*B25J 15/08* (2006.01)

(52) U.S. Cl. ............. 294/106; 269/95; 269/228; 901/31

(58) Field of Classification Search ................... 294/104, 294/106, 111, 99.1; 414/5, 6, 7; 901/31, 901/36, 39; 24/DIG. 52; 292/194, 256, 256.69, 292/DIG. 4; 269/24–27, 32, 228, 91, 95, 269/71

See application file for complete search history.

(56) References Cited

U.S. PATENT DOCUMENTS

| | | |
|---|---|---|
| 2,103,379 A | 12/1937 | Oxford |
| 2,511,416 A | 6/1950 | Rundorff |
| 3,680,436 A | 8/1972 | Marsland |
| 3,845,963 A | 11/1974 | Price |
| 4,124,318 A | 11/1978 | Sagady |
| 4,188,942 A | 2/1980 | Fehlberg |
| 4,238,167 A | 12/1980 | Brugger et al. |
| 4,274,774 A | 6/1981 | Haga et al. |
| 4,502,808 A | 3/1985 | Didion et al. |
| 4,551,903 A | 11/1985 | Bisiach |
| 4,636,135 A | 1/1987 | Bancon |
| 4,640,639 A | 2/1987 | Matsui |
| 4,664,588 A | 5/1987 | Newell et al. |
| 4,668,119 A | 5/1987 | Galletti |
| 4,710,093 A | 12/1987 | Zimmer et al. |
| 4,756,638 A | 7/1988 | Neyret |
| 4,758,122 A | 7/1988 | Kubo |
| 4,766,775 A | 8/1988 | Hodge |
| 4,815,780 A | 3/1989 | Obrist |
| 4,863,206 A | 9/1989 | Kaufmann |
| 4,883,939 A | 11/1989 | Sagi |
| 4,897,014 A | 1/1990 | Tietze |
| 4,905,938 A | 3/1990 | Braccio et al. |
| 4,906,123 A | 3/1990 | Weskamp et al. |
| 4,990,022 A | 2/1991 | Watanabe et al. |
| 4,993,132 A | 2/1991 | Manz |
| 4,996,753 A | 3/1991 | Jones |
| 5,069,524 A | 12/1991 | Watanabe et al. |
| 5,118,248 A | 6/1992 | Brucher |

(Continued)

*Primary Examiner* — Dean Kramer
*Assistant Examiner* — Stephen Vu
(74) *Attorney, Agent, or Firm* — The Webb Law Firm, P.C.

(57) ABSTRACT

This invention is an assembly and method for releasably connecting a gripper finger to a robotic arm with only manual manipulation. The assembly includes a finger body having a quick-change bar connected to a locking lever. The locking lever can be rotated by hand to engage and disengage the assembly to connect a finger to a gripper connected to a robot. The locking lever provides a sleeve and pin which interact to lock the assembly. The sleeve and pin can have recessed surfaces formed to interact with roll pins or screws to restrict behavior of the quick-change device during engagement.

13 Claims, 10 Drawing Sheets

U.S. PATENT DOCUMENTS

| | | | |
|---|---|---|---|
| 5,156,481 A | 10/1992 | Overbay et al. | |
| 5,167,478 A | 12/1992 | Ramunas | |
| 5,186,567 A | 2/1993 | Evenson et al. | |
| 5,195,761 A | 3/1993 | Eimer | |
| 5,211,693 A | 5/1993 | Pacher | |
| 5,243,264 A | 9/1993 | Takada et al. | |
| 5,256,128 A | 10/1993 | Neumann | |
| 5,261,758 A | 11/1993 | Vranish | |
| 5,284,375 A * | 2/1994 | Land, III | 294/202 |
| 5,294,209 A | 3/1994 | Naka et al. | |
| 5,328,222 A | 7/1994 | Sartorio et al. | |
| 5,372,464 A | 12/1994 | Bureller | |
| 5,397,159 A | 3/1995 | Sartorio et al. | |
| 5,460,536 A | 10/1995 | Cullen | |
| 5,501,498 A * | 3/1996 | Ulrich | 294/106 |
| 5,575,597 A | 11/1996 | Bailey et al. | |
| 5,624,364 A | 4/1997 | Zimmer | |
| 5,632,588 A | 5/1997 | Crorey et al. | |
| 5,647,554 A | 7/1997 | Ikegami et al. | |
| 5,661,387 A | 8/1997 | Stadele et al. | |
| 5,752,904 A | 5/1998 | Irri | |
| 5,782,571 A | 7/1998 | Hufford et al. | |
| 5,857,815 A | 1/1999 | Bailey et al. | |
| 5,879,277 A | 3/1999 | Dettman et al. | |
| 5,904,358 A * | 5/1999 | Hosono et al. | 279/115 |
| 5,938,259 A * | 8/1999 | Sawdon et al. | 294/116 |
| 5,993,365 A | 11/1999 | Stagnitto et al. | |
| 6,000,888 A | 12/1999 | Hartman | |
| 6,113,343 A | 9/2000 | Goldenberg et al. | |
| 6,116,966 A | 9/2000 | Little et al. | |
| 6,290,182 B1 | 9/2001 | Grunditz | |
| 6,349,884 B1 | 2/2002 | Thome et al. | |
| 6,379,072 B1 | 4/2002 | Brown et al. | |
| 6,447,197 B1 | 9/2002 | Hiura | |
| 6,533,594 B1 | 3/2003 | Kurup | |
| 6,719,677 B2 | 4/2004 | Izumi | |
| 6,767,198 B2 | 7/2004 | Weinstein et al. | |
| 7,074,129 B2 | 7/2006 | Sugiyama et al. | |
| 7,204,792 B2 | 4/2007 | Hagihara et al. | |
| 7,210,212 B2 | 5/2007 | Lin | |
| 7,252,453 B1 | 8/2007 | Little | |
| 7,350,760 B2 * | 4/2008 | Yamaura | 249/219.1 |
| 7,484,736 B2 | 2/2009 | Allemann et al. | |
| 7,559,265 B2 | 7/2009 | Mizuno | |
| 7,628,093 B2 | 12/2009 | Madhani et al. | |
| 2002/0166403 A1 | 11/2002 | Choset et al. | |
| 2004/0012160 A1 | 1/2004 | Krondorfer et al. | |
| 2004/0142803 A1 | 7/2004 | Fitzgibbon | |
| 2004/0267254 A1 | 12/2004 | Manzo et al. | |
| 2006/0017237 A1 | 1/2006 | Lin | |
| 2006/0088367 A1 | 4/2006 | Dellach et al. | |
| 2007/0228670 A1 | 10/2007 | Norton et al. | |
| 2007/0231063 A1 | 10/2007 | Tsutsumi et al. | |
| 2007/0293380 A1 | 12/2007 | Kausch et al. | |
| 2008/0016979 A1 | 1/2008 | Yasumura et al. | |
| 2008/0056859 A1 | 3/2008 | Inoue et al. | |
| 2008/0119339 A1 | 5/2008 | Oliver | |
| 2008/0132393 A1 | 6/2008 | Jordil et al. | |
| 2008/0216596 A1 | 9/2008 | Madhani et al. | |
| 2008/0229861 A1 | 9/2008 | Inoue et al. | |
| 2008/0232932 A1 | 9/2008 | Jinno | |
| 2008/0236324 A1 | 10/2008 | Inoue et al. | |
| 2008/0257095 A1 | 10/2008 | Kent | |
| 2009/0139375 A1 | 6/2009 | Hathaway et al. | |

* cited by examiner

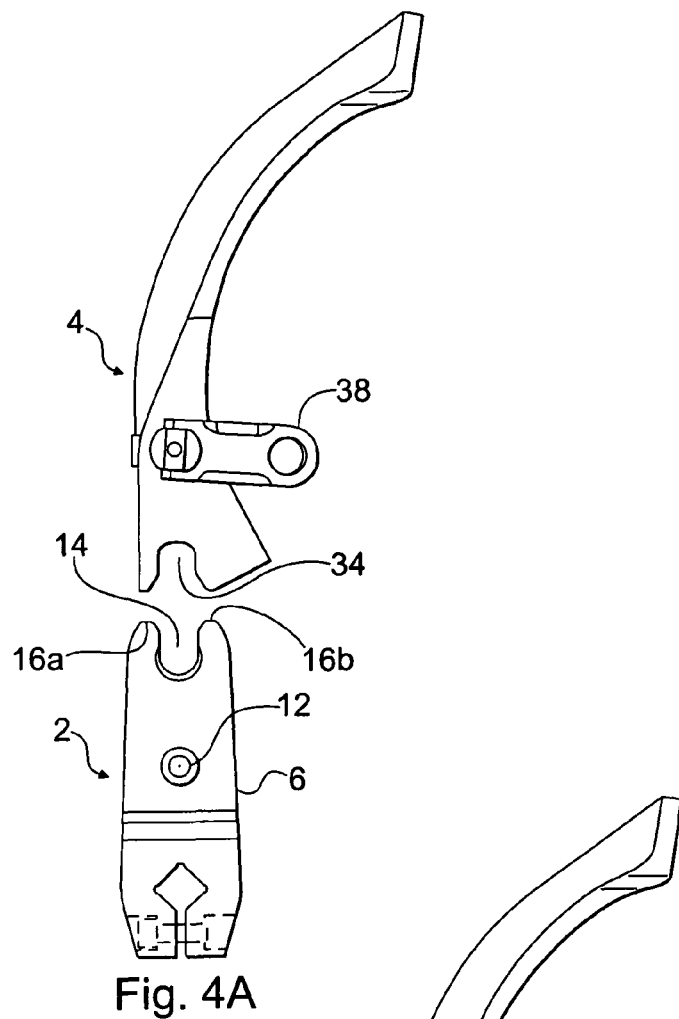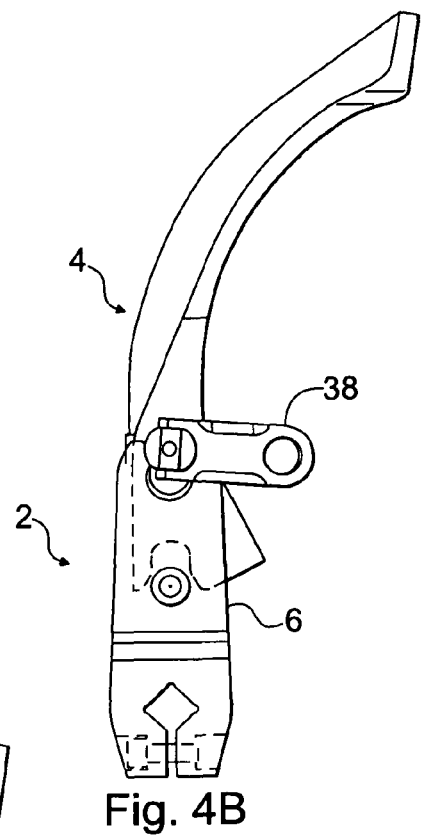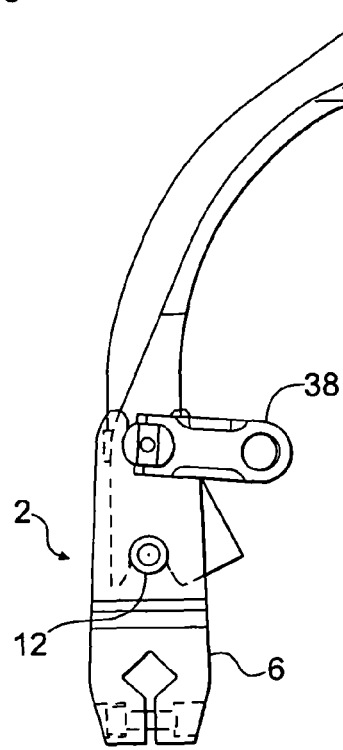
Fig. 4A
Fig. 4B
Fig. 4C

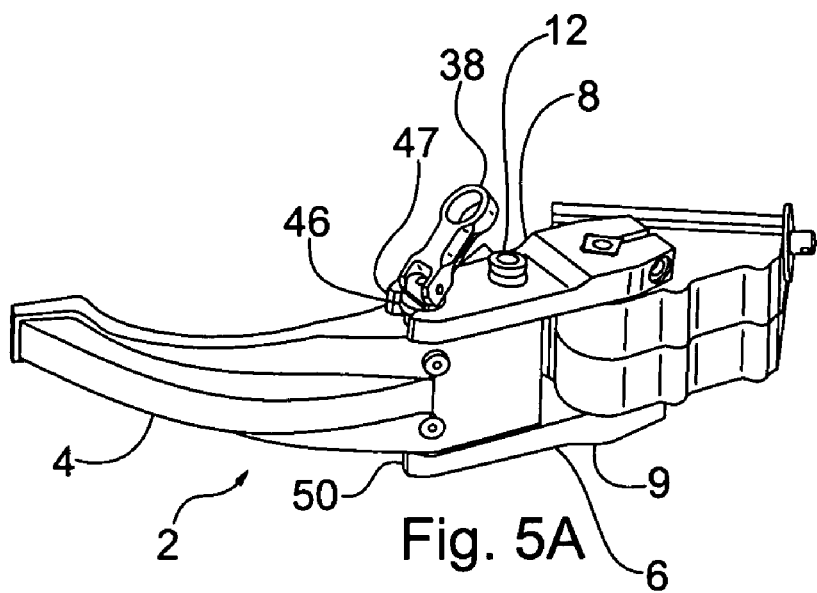
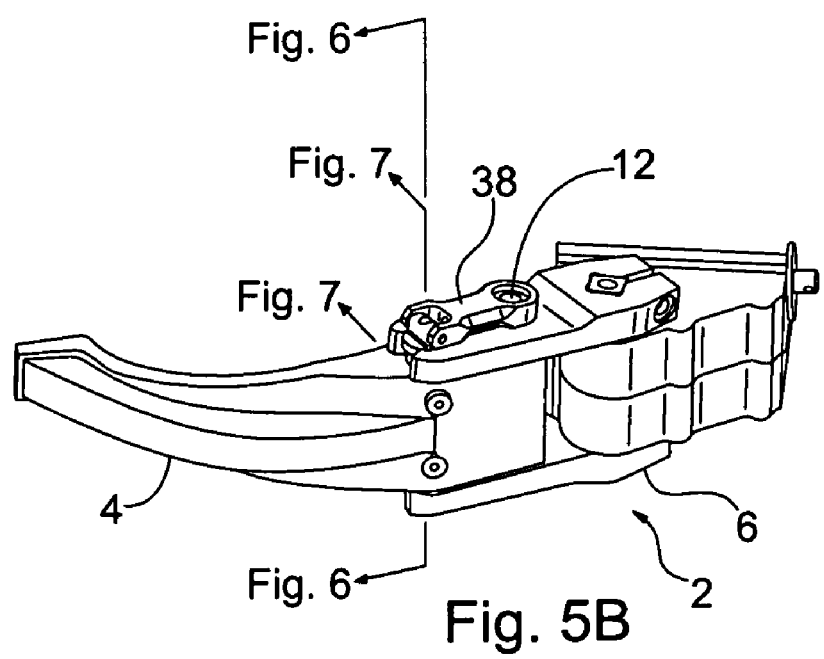

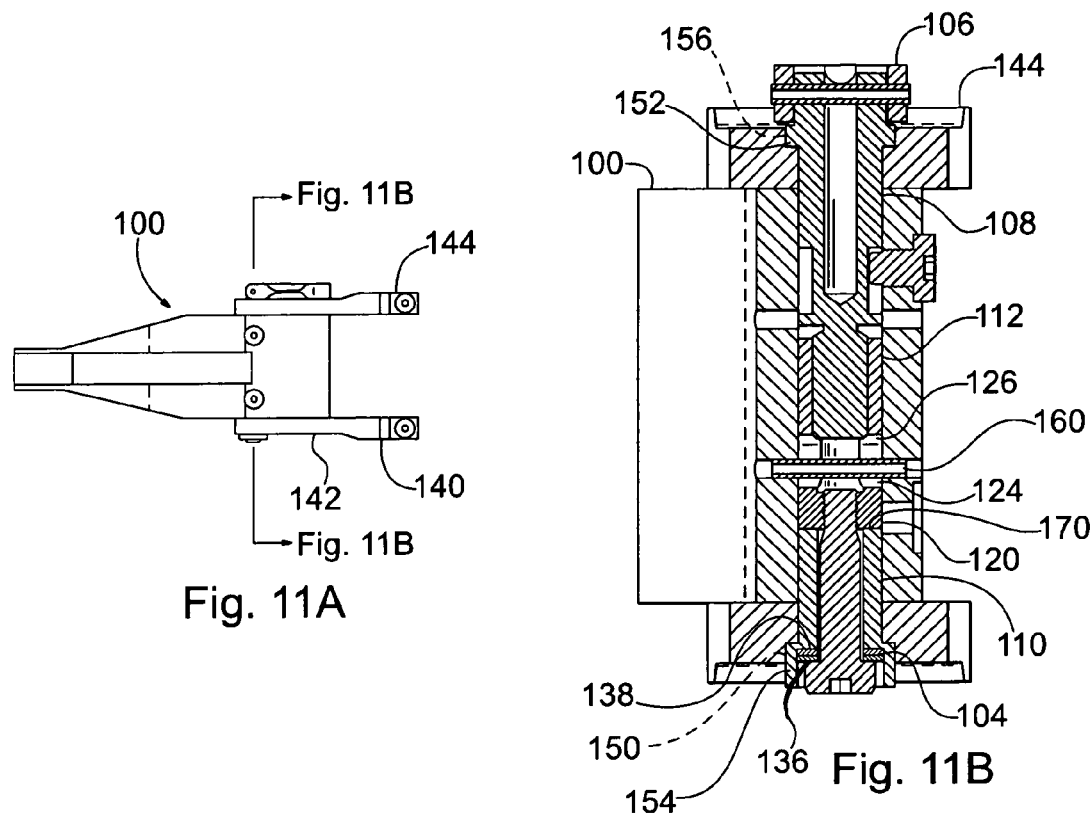
Fig. 11A
Fig. 11B
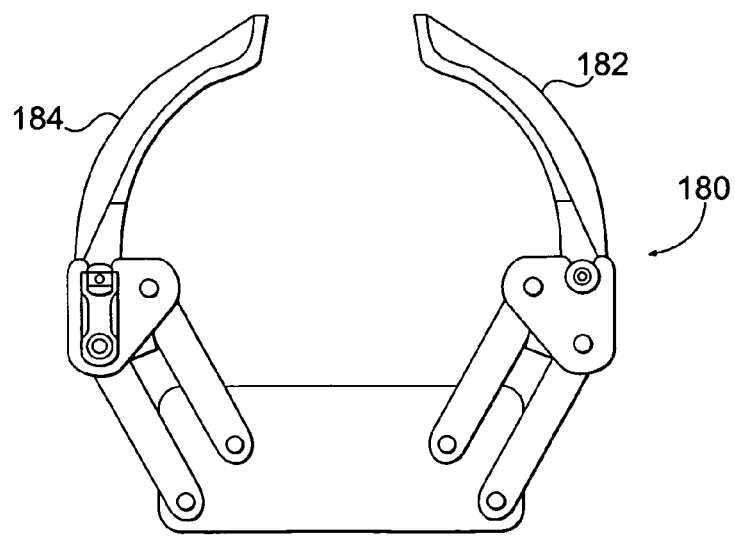
Fig. 12

QUICK-CHANGE FINGER FOR ROBOTIC GRIPPER

CROSS REFERENCE TO RELATED APPLICATIONS

This application is based on U.S. Provisional Patent Application No. 61/268,352, filed Jun. 11, 2009, on which priority of this patent application is based and which is hereby incorporated by reference in its entirety.

BACKGROUND OF THE INVENTION

Field of the Invention

The most common tool that is used on manipulators mounted on mobile robots is a gripper, which allows the robot to grasp and move objects to fulfill their operational requirements. However, no single gripper design is optimal for all tasks, which is a problem for grippers on mobile robots, since their tasks are unstructured, vary widely, and change frequently. One way to customize a gripper for a specific task is to design a set of fingers, also called jaws, for the gripper that is specific to that task. For example, a task requiring a robot to reach deep inside a narrow opening might benefit by having a set of long, narrow fingers. However, long, narrow fingers would not be suited to lifting and controlling large masses, where a shorter, broader finger would provide optimal control. For tasks involving grasping of a small or fragile object, a gripper with a compliant gripping facial surface is desirable. However, those compliant surfaces deteriorate quickly and are replaced frequently; therefore, the ability to quickly install replacements in the field is an advantage.

Currently deployed systems use grippers with fingers that are permanently installed during assembly, and are only repaired or replaced in a factory or depot setting. This limits the effectiveness of the robot/manipulator to missions which can be achieved with specific installed fingers. Even grippers with replaceable fingers typically require a technician to replace the fingers which require time, materials, and special tools which are not always readily available in the field. Particularly, in time critical applications, such as military or civilian Explosives Ordinance Disposal (EOD), this process interferes with completing missions in a timely way. For these scenarios, there exists a need to change gripper fingers quickly.

Military and law enforcement groups are increasingly relying on UGVs to perform life-threatening tasks ranging from under car inspection to EOD. As small UGVs, such as Omni-Directional Inspection Systems (ODIS), Talon and Packbot have gained acceptance, the variety of tasks they have been required to perform has increased.

In addition, unlike industrial robots, these systems are deployed in uncontrolled environments. They must have a robust design to survive the normal working environment they will encounter, both during deployment on the mobile robot and when the manipulator and tools are being stored or transported. The mechanical connection must be resilient to minor variations in tolerances of mating components, such as might occur when a tool is dropped or bumps against another tool in the toolbox, or such as might be caused by the presence of debris, such as dirt and sand, from the working environment.

Robotic arms often require specialized configurations to accomplish their particular mission, requiring change in the length of a link in the arm or attaching a different end effector or tool.

An object of the present invention is to provide a quick-release assembly for separating robotic gripper fingers mechanically from their manipulator arms, thus allowing unhindered integration of fingers as the complexity of the system is contained in the manipulator arms. A further object is to make the gripper fingers replaceable units that can be replaced by hand when they fail.

SUMMARY OF THE INVENTION

The present invention is an assembly for releasably connecting a gripper finger to a robotic arm having a gripper having a first and second arm and a cylindrical gripper bar connecting the arms. The arms have parallel circular cavities. Opening in the cavities define a first and second lip, and a concentric recessed area positioned on an external area of the gripper arm around the cavity. A finger member can have a finger and a body. The body can have a locking lever connected to a bar extending through the finger body and a cylindrical cavity. The cavity can have a longitudinal passageway along the length of the cavity. The passageway forms a first and second lip and the gripper bar mates with the passageway of the cavity and the openings of the arms of the gripper receiving the locking bar of the finger member, wherein the locking lever is rotated and clamps the gripper to the finger member.

The gripper bar can have a head and a shaft, and retaining member extending into a cylindrical cavity of the locking lever. The gripper bar can have a groove in the head of the cylindrical bar of the gripper with a retaining member engaging the groove to lock the locking bar when the cavity of the locking lever is positioned around the head of the cylindrical bar. The retaining member can be a threaded retaining pin. The locking lever can have a cavity having a threaded surface for threadably receiving to the threaded retaining pin.

The locking bar of the present invention, in one embodiment, can have a pin having a flanged first end and a second end. The locking lever rotatably connects to the flanged first end of the pin and the second end of the pin can have a threaded surface. A sleeve, having an axial bore and a flanged second end connects to the pin. The axial bore of the sleeve has a threaded surface, wherein said threaded surface of the bore of the sleeve is threadably connected to the threaded surface of the second end of pin. The assembly further has a threaded member, a slotted surface between the pin and the finger body formed of a recess extending radially about the circumference of the pin, the recess can have a first and second wall and a hole through the finger body can be aligned with the slotted surface, where the threaded member is received by the hole through the gripper and into the slotted surface. The first and second wall limits vertical movement of the pin.

In order to limit vertical and rotational movement of the sleeve, the sleeve can have a slotted surface defined as an opening, the opening can have an upper and lower vertical wall and symmetric side walls formed partially along the length and extending radially through the sleeve. A hole through the finger body can be in alignment with the slotted surface of the sleeve, wherein the roll pin is received by the hole and displaced through the finger body through the slotted surface into the finger body. The slotted surface of the sleeve interacts with the roll pin to limit rotational movement of the sleeve. The slotted surface interacts with the pin to limit vertical movement of the sleeve.

In another embodiment, a spring can be positioned between the recess and the flanged surface of the sleeve. The spring is for adjusting the locking bar and locking lever during engagement. The locking lever and bar of the finger limits longitudinal rotation of the finger about the gripper. The gripper arms limit vertical rotation of the finger. The gripper bar and locking bar limit lateral rotation of the finger. The surfaces of the longitudinal passageway of the finger body cavity are smoothed surfaces for sliding the bar into alignment. The first and second lip of the gripper arm cavities can be chamfered for directing alignment. The finger member can connect to grippers having deviation in manufacturing.

A finger member can have a finger and a body and can be designed to connect t different grippers. The body has a locking lever connected to a bar extending through the finger body and a cylindrical cavity. The cavity has a longitudinal passageway along the length of the cavity. The passageway forms a first and second lip, wherein the passageway of the cavity is operable to mate with a gripper bar of a gripper and locking bar of the finger member can mate with gripper arms of a gripper. The locking lever is operable to rotate and clamp a gripper to the finger member. The locking lever has a degree of compliance to account for variations in the gripper.

The present invention further includes a method for releasably connecting a gripper finger to a robotic arm by providing a gripper having a first and second arm and a cylindrical gripper bar connecting the arms.

The method further includes providing a retaining member extending into a cylindrical cavity of the locking lever, a groove in the head of the cylindrical bar of the gripper, positioning retaining member in the groove, and locking the locking bar when the cavity of the locking lever is positioned around the head of the cylindrical bar.

Next, the method includes providing a pin having a flanged first end and a second end. The locking lever can rotatably connect to the flanged first end of the pin. The second end of the pin has a threaded surface. Also provided is a sleeve having an axial bore extending therethrough and a flanged second end. The axial bore has a threaded surface, connecting the threaded surface of the bore of the sleeve to the threaded surface of the second end of the pin. Rotating the locking lever by rotating the lever causes the sleeve to threadably connect.

The method further includes providing a threaded member, providing a slotted surface between the pin and the finger body formed of a recess extending radially about the circumference of the pin. The recess has a first and second wall. A hole through the finger body aligned with the slotted surface is provided, receiving the threaded member by the hole through the gripper and into the slotted surface, and limiting vertical movement by the first and second wall limiting of the pin.

Finally, the method provides a roll pin, providing a slotted surface of the sleeve. The slotted surface is a opening formed partially along the length and extending radially through the sleeve providing a hole through the finger body in alignment with the slotted surface of the sleeve, receiving the roll pin by the hole, displacing the roll pin through the finger body and through the slotted surface into the finger body, which limits rotational movement of the sleeve when the slotted surface of the sleeve interacts with the roll pin.

BRIEF DESCRIPTION OF THE DRAWINGS

FIG. 4A is a side view of the quick-change assembly of the present invention before it is engaged;

FIG. 4B is a side view of the quick-change assembly of the present invention partially engaged showing the progression of the finger body onto the gripper bar;

FIG. 4C is a side view of the quick-change finger resting on the robotic gripper of the present invention;

FIG. 5A is a top-perspective view of the quick-change assembly of the present invention showing the locking lever partially engaged;

FIG. 5B is a top-perspective view of the quick-change assembly of the present invention showing the locking lever fully engaged;

FIG. 11A is a top-perspective view of the quick-change assembly of the present invention;

FIG. 11B is a sectional view of the object depicted in FIG. 11A taken along broken lines labeled A with the arrows indicating the direction of sight of the present invention;

FIG. 12 is a top-perspective view of an alternative finger arrangement exhibiting multiple gripper and assembly combination.

DESCRIPTION OF THE PREFERRED EMBODIMENTS

An object of the present invention is to provide a quick-change assembly for changing tools, specifically a finger, to a robotic manipulator. The quick-change assembly can facilitate tool replacement as the tasks that the robot is needed to perform changes. The quick-change assembly can be used to attach any finger adapted to use the assembly to a gripper, where the gripper is attached to a robot arm. In addition, the quick-change mechanism can be used to attach different types of fingers, as required by a particular task, including different sizes, including long, short, thin, or wide fingers, fingers having specialized surfaces, fingers made from various materials, and fingers with shapes as required for a different job, such as a straight or arched-shaped finger. Types of tools that one skilled in the art could envision using with the present invention include an arm linkage, an arm segment, an arm extender, a gripper, a gimble grip, a flexible joint, a tilt table, a dozer, a shovel, a plow, a pan-tilt table, a digger, a sensor, a disruptor, a drill, a saw, a cutter, a grinder, a digging tool, or a camera. A further object of the invention is the manual operability of the assembly. The quick-change assembly facilitates the rapid change of the finger from the robot by providing a mechanism manual operable, therefore, no external tool is needed to detach and engage the robot tool. The quick-change assembly can also be adapted to provide multiple quick-change assemblies in a tool for load balancing or adapting certain types of fingers and certain types of grippers.

Figure 1:
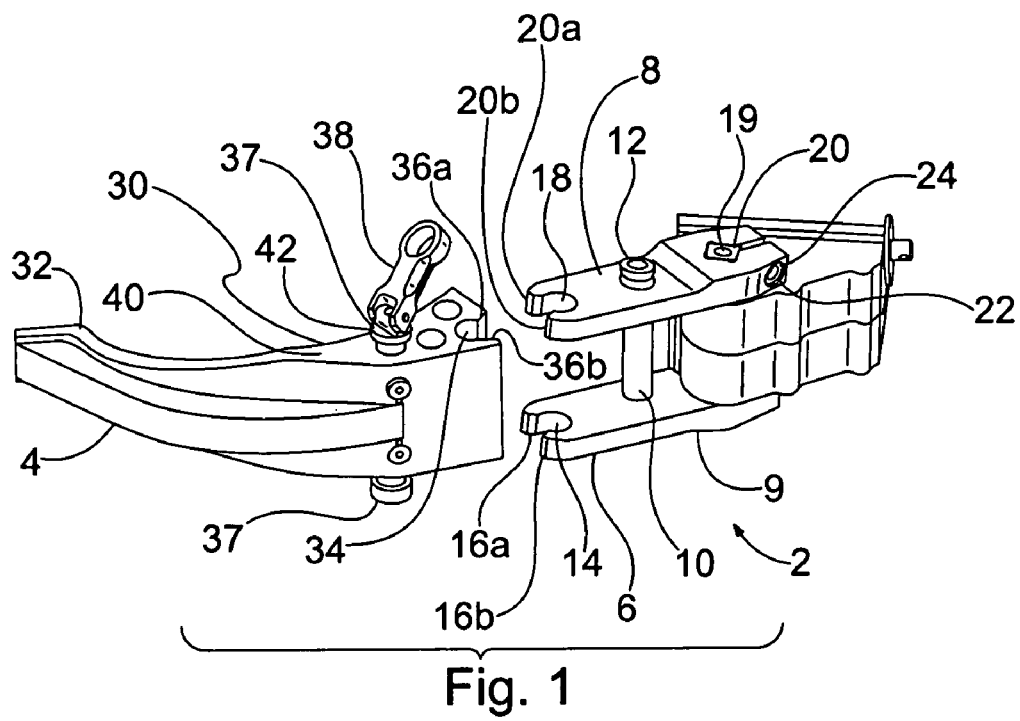
FIG. 1 is a top-perspective view of the quick-change assembly of the present invention.

With reference to FIG. 1, a quick-change mechanism 2, having a gripper mechanism defined as a gripper 6 and a tool member defined as a finger member 4, is shown mated but not engaged. Gripper 6 can include gripper arms 8 and 9. The gripper arms 8 and 9, having a cylindrical bar defined as the gripper bar 10 therebetween, securing arm 8 to arm 9. The gripper bar 10 can be connected to the arms 8 and 9 by passing threaded ends (not shown) of the gripper bar 10 through a hole in gripper arms 8 and 9, and connecting to each end of the gripper bar 10 with a bolt defined as head 12 threadably connected. It will be recognized by one of skill in the art that other types of coupling mechanics can be used to connect the bar to the arms 8 and 9 while still providing head 12. Each gripper arm 8 and 9 can also include, at one end, a semi-circular cavity 14 and 18. The circular cavities 14 and 18 are symmetrical and share the same axis. Cavity 14 includes lips 16A and 16B. The edges of lips 16A and 16B can be chamfered to facilitate the engagement of finger 4. Likewise, cavity 18 includes a symmetrical set of lips 20A and 20B having chamfered edges. Gripper 6 can have, at a distal end, an attachment mechanism in one embodiment the attachment mechanism can be defined by a hole 19, bearing 20, attachment hole 22, and attachment member 24. The attachment mechanism can be used to connect the quick-change mechanism to a robot. One skilled in the art could recognize that other attachment mechanisms for attaching a quick-change mechanism to a robot are possible and variable, depending on the available robotic manipulator. Although aluminum is used in the preferred embodiment, other types of materials can be used to achieve strength or to affect weight. These materials include steel, titanium, stainless steel, brass, carbon composite, acetal resin, fiber glass composite, polyethelyne, or plastic.

With continued reference to FIG. 1, the tool member can be defined as a finger member 4 having a finger body 30 and a finger 32. The finger body 30, shown in FIG. 1, is one type of finger that can be used with the present invention as one skilled in the art could recognize that other types of fingers would be adaptable to the quick-change mechanism of the present invention, as previously discussed. The finger body 30 can have a semi-circular cavity forming a longitudinal passageway 34 along the length of the cavity through the proximate end of the finger body 30. The passageway 34 can have members defined as a first lip 36A and second lip 36B, similarly formed along the length of the passageway 34. The lips 36A and 36B can be adapted to mate with the cylindrical gripper bar 10. In addition, finger body 30 can have a locking bar 37 and a locking lever 38. The locking bar 37 can extend through a passage 40 formed in the finger body 30.

Figure 2:
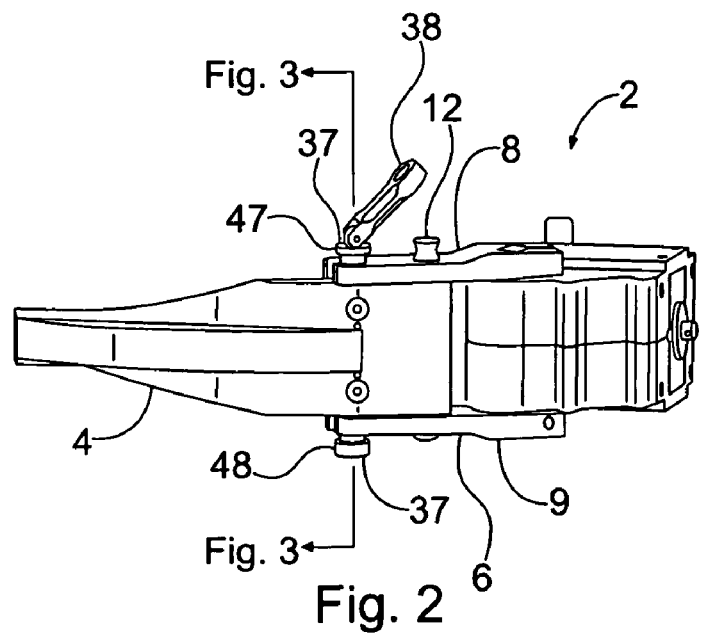
FIG. 2 is a side-perspective view of the quick-change finger and robotic gripper of FIG. 1, shown partially engaged.

FIG. 2 shows the finger member 4 and gripper member 6 of the present invention in an engaged position. As shown, the quick-change mechanism 2 having finger 4 mated with the gripper 6 is shown, with the gripper bar 10 displaced into the passageway 34 and the cavities 14 and 18 of gripper 6 mating locking bar 37 of finger body 30. The locking lever 38 is open and not engaged; therefore, the finger 4 is removable from the gripper 6.

Figure 3:
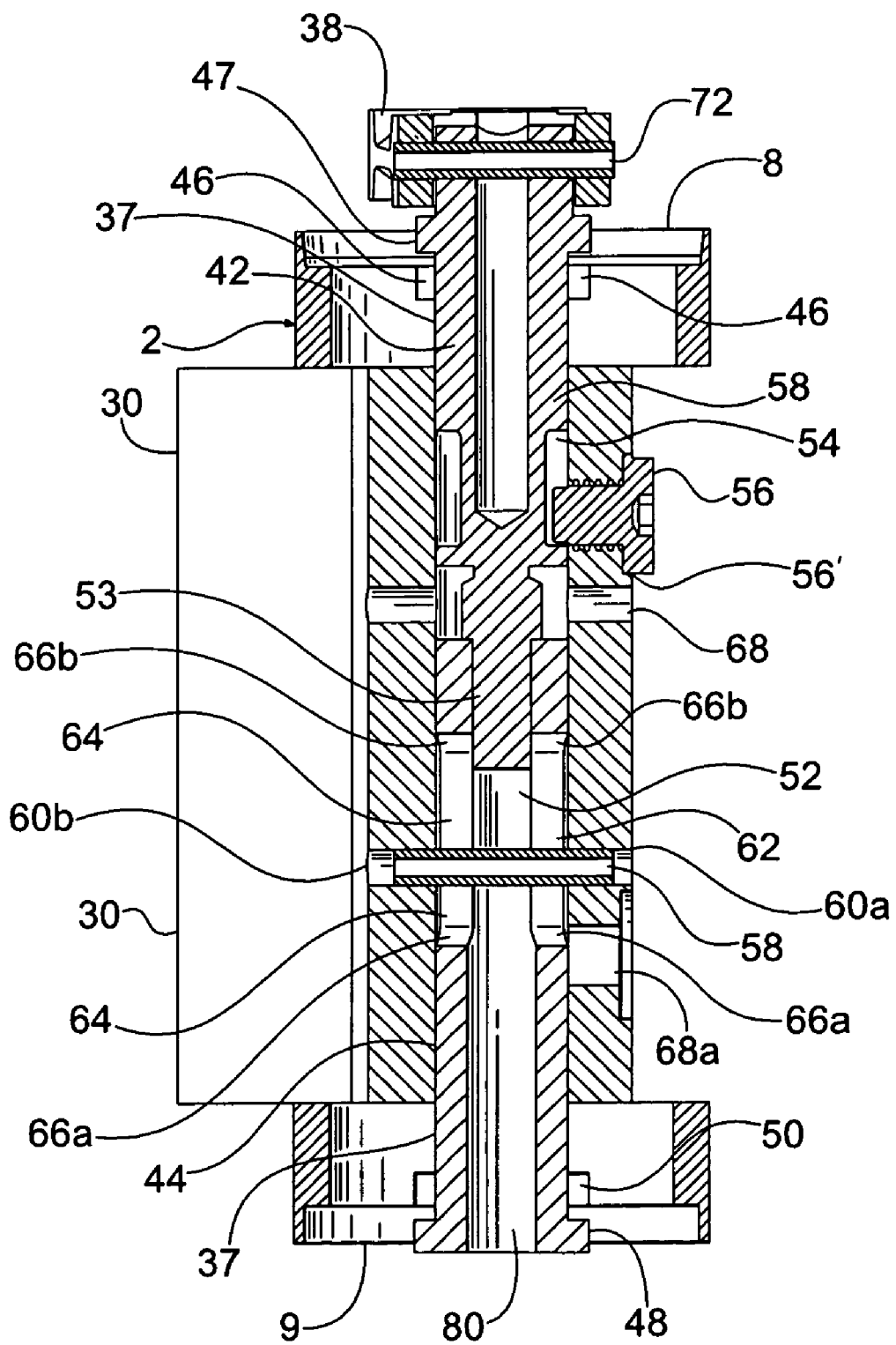
FIG. 3 is a sectional view of the object depicted in FIG. 2 taken along broken lines labeled FIG. 3 with the arrows indicating the direction of sight of the present invention.

With reference to FIG. 3, the locking bar 37 of the quick-change mechanism 2 is shown in detail having a pin 42 and a sleeve 44, the pin 42 having a flanged surface 47 and sleeve 44 having a flanged surface 48. The flanged surfaces 47 and 48 can mate with respective recessed surfaces 46 and 50 in the gripper arms 8 and 9 when the quick-change mechanism 2 is engaged, thereby keeping the finger 4 tightly connected to the gripper 6. A feature of the present invention can be the interchangeability of the parts as the orientation of the finger member 4 with gripper 6 is not limiting. In other words, the gripper 6 can mate with an upward or downward facing finger 4.

With continuing reference to FIG. 3, when the pin 42 and sleeve 44 are mated, a threaded surface 53 on pin 42 can be received by a threaded surface 52 on an axial bore 80 of the sleeve 44. The pin 42 is connected to the sleeve 44 by rotating the pin 42 and causing threaded surfaces of the sleeve 44 and pin 42 to threadably connect. Rotation of the pin 42 is caused by turning the locking lever 38. The engaged length of the sleeve 44 and pin 42 to form locking bar 37 decreases as it rotates and causes the flange surfaces 47 and 48 to move into engagement with the recesses 46 and 50. The pin 42 can have a slotted surface 54 to limit vertical movement of the pin 42 within the finger 4. The slotted surface 54 is an area of pin 42 recessed radially into the pin 42 to form a circumferential cavity surrounding the pin 42. The slotted surface 54 can extend entirely about the circumference of the quick-change pin 42. The shape of the slotted surface 54 can be varied to cause different behaviors, for example, the recess could also be formed of a partially, circumferential slot thereby, limiting both vertical and horizontal movement of said pin 42.

The quick-change mechanism 2 can have a member displaced therein, which can stop the quick-change pin 42 from moving vertically while forcing the vertical movement of the sleeve 44. In one embodiment, a threaded member, defined as pilot screw 56, is received by a threaded cavity 56' formed in the finger body 30 of finger 4 and further received by aligned slotted surface 54 of pin 42. The pilot screw 56 can be used to force the movement of the sleeve 44 perpendicular to the finger body 30 by limiting the quick-change pin 42 from moving perpendicular to the finger body 30 and gripper arms 8 and 9 when the pilot screw 56 is adjacent the walls formed by the slotted surface 54. Pin 42 is rotated into the quick-change sleeve 44. The pilot screw 56 is adjacent a recessed area 50 of the pin 42 and when the lever 38 is rotated, it causes the threadable connection to force the sleeve 44 to move vertically, perpendicular to finger body 30. In this way, the flange 48 of sleeve 44 is mated or unmated from recess 50 in gripper arm 9.

The sleeve 44 includes two slotted surfaces 62 and 64. These slotted surfaces 62 and 64 can limit movement of horizontal rotation. The slotted surfaces 62 and 64 are rectangular openings formed by a slot extending radially through the sleeve 44. The openings are symmetrically formed on each side of the axial bore 80 of sleeve 44.

For limiting sleeve rotation, roll pin 58 can be used by the quick-change mechanism 2. The roll pin 58 can limit rotation of the sleeve 44 as a threaded pin 42 is displaced therein. The effect of this roll pin 58 is to force the threading rotational movement of sleeve 44 and pin 42 to engage the sleeve 44 by displacement into the sleeve 44 and reduce slipping. The roll pin 58 is positioned in the gripper 6 through cavity 60A aligned through the slotted surfaces 62 and 64 of sleeve 44 and the aligned cavity 60B. Roll pin 58 is therefore positioned to counteract any rotational force on sleeve 44. In other embodiments, sleeve 44 can have a slightly different slotted surface, the roll pin 58 can be used to stop the sleeve 44 from moving perpendicular to the gripper arms 8 and 9, and finger body 30 by limiting vertical travel of the sleeve 44, as previously discussed. A wall 66a or 60b defined by a slotted surface can be used to limit vertical movement of the sleeve 44.

The roll pin 58 limits vertical movement of the threaded sleeve 44 only. The pilot screw 56 limits vertical movement of the quick-change pin 42. In the case where the assembly 2 is locked onto the gripper arms 8 and 9 and the assembly experiences binding due to corrosion, debris, damage, or wear, this feature can help to disengage. As the user turns the locking lever 38 counter clockwise and overcomes the binding, the sleeve 44 and the pin 42 un-thread from each other and the overall length increases. If the roll pin 58 is in place but pilot screw 56 is not used, it is likely that only the top 47 or bottom flange 48 would unseat from the gripper arms 8 and 9, and the user would probably need to hammer the post assembly to free the other flanges. In addition, the pilot screw 56 can keep the user from completely unscrewing the pin 42 by keeping it captive.

With the roll pin and pilot screw, as the user unscrews the locking lever, the roll pin will limit travel in one direction and the pilot screw limit it in the other direction. Each flange will be forced out to the position that clears the gripper arms, regardless of which side breaks loose first.

As shown in FIG. 3, additional holes 68A and 68B are provided to adapt the finger body 30 to an upward or downward facing finger orientation as needed in the implementation of the present invention. The locking lever 38 is attached to pin 42 by a member defined as pin 72 as positioned through the center of lever 38 and pin 42 and can hold the locking lever 38 to the quick-change pin 42, forcing the quick-change pin 42 to rotate as the locking lever 38 is turned clockwise or counterclockwise.

With reference to FIGS. 4B and 4C, the engagement motion of the quick-change mechanism 2 is shown. In FIG. 4A, finger 4 and gripper 6 are disengaged, however, a motion A and B is moving the finger member 4 and gripper 6 together. With reference to FIG. 4B, in phantom, the finger body 30 of finger member 4 is shown almost engaging gripper bar 10 of the gripper 6. Finally, with reference to FIG. 4C, the movement is complete, the gripper bar 10 of the gripper 6 is fully mated with the passageway 34 of finger body 30 of finger member 4, and the quick-change mechanism 2 is ready to be engaged.

With reference to FIG. 5A, finger 4 is shown engaged with the gripper 6 and the locking lever 38 has been rotated as seen in FIG. 5A and the flanged surfaces 47, 48 (48 not shown in FIG. 5A) are displaced into the recessed area 46 and 50 (50 not shown in FIG. 5A) of the gripper arms 8 and 9, respectfully. The pin 42 can be seen displaced into gripper 6, see FIG. 5A. As distinguished from the pin 42 in FIG. 2, where the flange surfaces 47 and 48 are shown extending outward from the gripper arms 8 and 9, indicating the locking lever 38 has not been rotated. The position of the flanged surfaces 47 and 48 in FIG. 5A indicates that the locking lever 38 has been rotated and the pin 42 has mated with the sleeve 44. With reference to FIG. 5B, a fully closed locking lever 38 is fully engaged. Locking lever 38 is mated to head 12, locked thereon.

Figure 6:
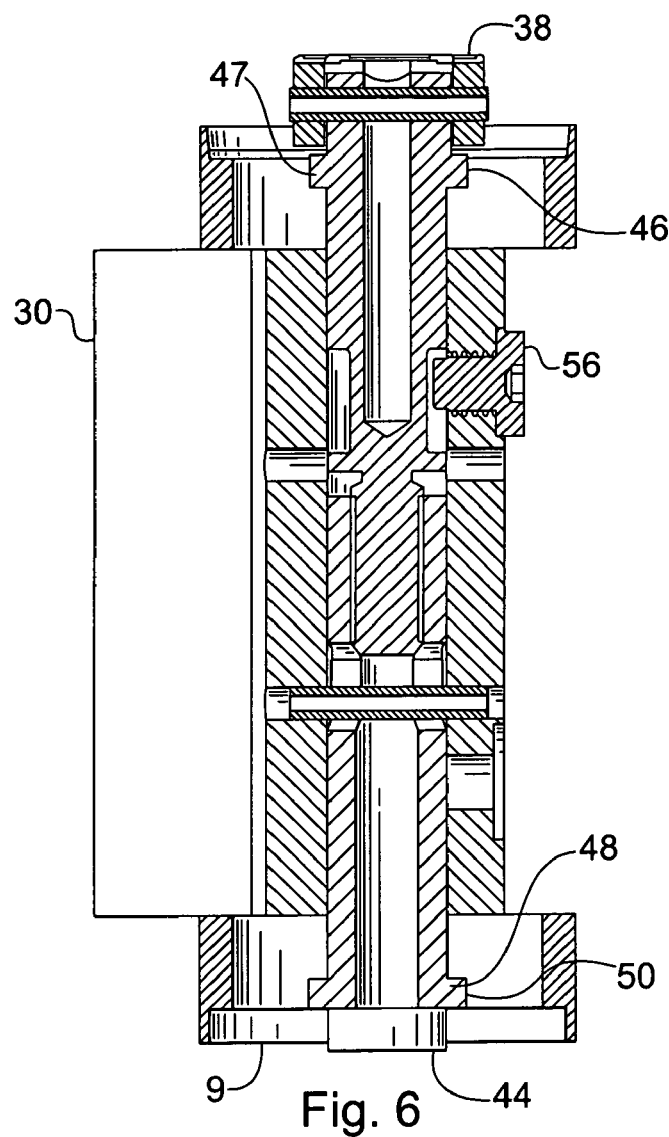
FIG. 6 is a cross-sectional view of the object depicted in FIG. 5B along the broken lines marked FIG. 6 showing a quick-change finger mechanism fully engaged.

With reference to FIG. 6, the closed locking bar 37 and locking lever 38 are distinguished from the open locking bar 37 and locking lever 38, shown in FIG. 3.

Figure 7:
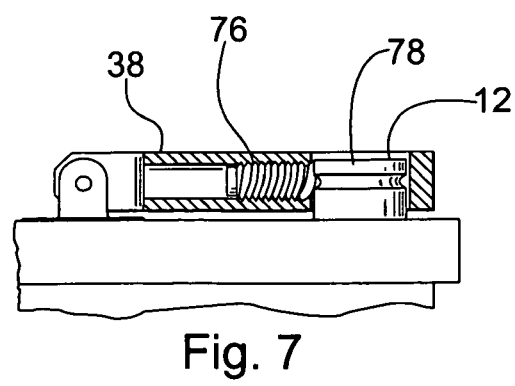
FIG. 7 is a side-perspective view of the locking lever fully engaged with the rear pillar head of the present invention.

With reference to FIG. 7, the locking bar 37 is shown in phantom with the member parts shown therein. Locking bar 38 can have a retaining pin 76. The retaining pin 76 engaged a slotted surface 78 in the head 12 of the gripper bar 10.

Figure 8:
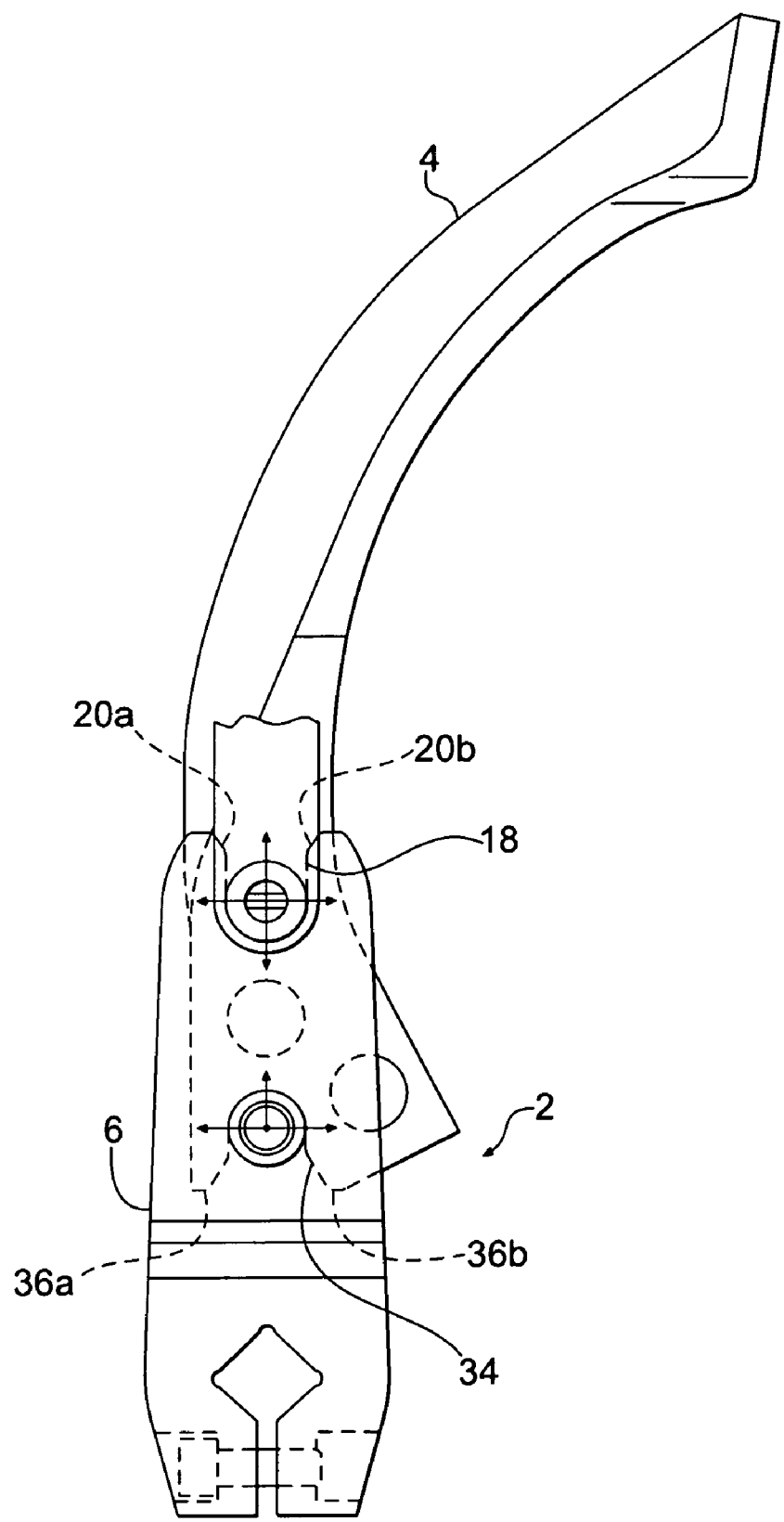
FIG. 8 is a side view showing the details of engagement in the quick-change assembly of the present invention.

With reference to FIG. 8, a transition of the degree of freedom can be restrained vertically, horizontally, and rotational about the axis. The finger body 30 is restricted from moving when attached to the gripper 6. The finger body 30 cannot move in the plan as shown by Arrow 80 and 82 and, in addition, is restrained from moving rotationally about the axis normal to the view. In addition, the surfaces 16A and 16B are shown providing alignment of the finger 4 during engagement with the gripper 6, first lip 36A and second lip 36B sliding smoothly onto gripper bar 10 of gripper 6.

Figure 9A:
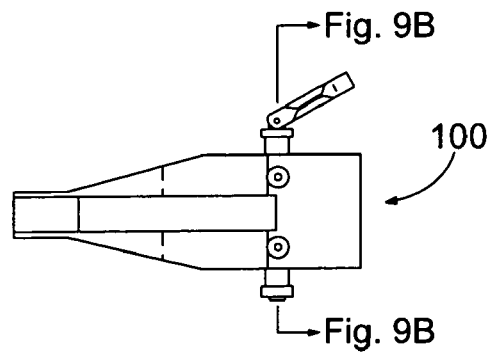
FIG. 9A is a top-perspective view of the quick-change assembly of the present invention.

With reference to FIG. 9A, a finger member 100 opened and ready to engage with a gripper is shown. One of the advantages of the present invention is the ability to interchange fingers and grippers. This ability to connect to different grippers presents a problem because the grippers can all have slightly different deviations. The deviations can be caused during manufacturing. For example, one design of a gripper can have arms with a specified thickness, where the thickness is required to be, for example within a $5,000^{th}$ of an inch, which can present unaccounted for variability of thickness range for the grippers manufactured. In other cases, debris, dirt and wear, can change the gripper over time. Therefore, manufacturing deviation or even wear and tear can account for slight deviations in the thickness of the gripper.

Deviations in gripper arm thickness can have dramatic effect on the quick-change assembly. In order to overcome these deviations, in an embodiment shown in FIG. 9B, the bar 102 of finger member 100 can have a spring, defined as a washer 104, in one embodiment a Belleville washer, to provide more compliance in the locking bar 102 when engaging the device with the locking lever 106. Locking bar 102 can have a pin 108, a sleeve 110, and a connector 112. The connector 112 is positioned between the pin 108 and sleeve 110 and has an axial bore 114 having a threaded first end 116 and a threaded second end 118. In addition the connector 112 can have a first wall 120 and a slotted surface 122 formed of symmetrical rectangular slots formed in the connector 112 defining a top and bottom wall 124 and 126 and side wall 122a and 122b (not shown).

Figure 9B:
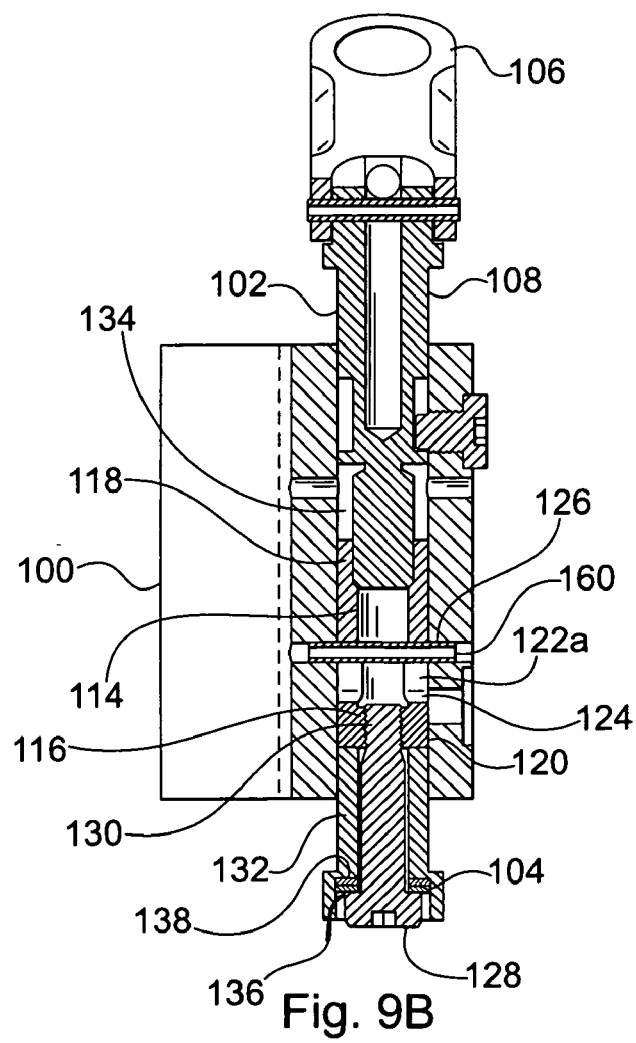
FIG. 9B is a sectional view of the object depicted in FIG. 9A taken along broken lines labeled A with the arrows indicating the direction of sight of the present invention.

With continuing reference to FIG. 9B, a threaded shoulder bolt 128 receives the spring 104 and then is received by the sleeve 110. The threaded end 130 of the shoulder bolt 128 is then threadably connected to the threaded first end 116 of the connector 112, as the bolt 128 is tightened, the shoulder 132 a resisting force is received from wall 120 of the connector 112. Further tightening of the bolt 128 causes the resistance of the washer 104 as compression is initiated between the surface 136 of shoulder bolt 128 and flanged surface 138. The threaded end 134 of pin 102 is received by the threaded second end 118.

Figure 10A:
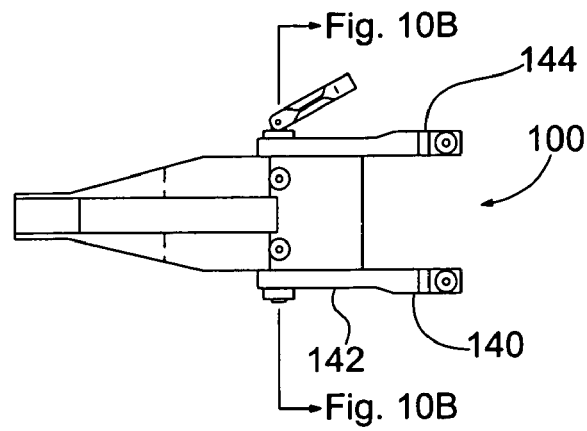
FIG. 10A is a top-perspective view of the quick-change assembly of the present invention.
Figure 10B:
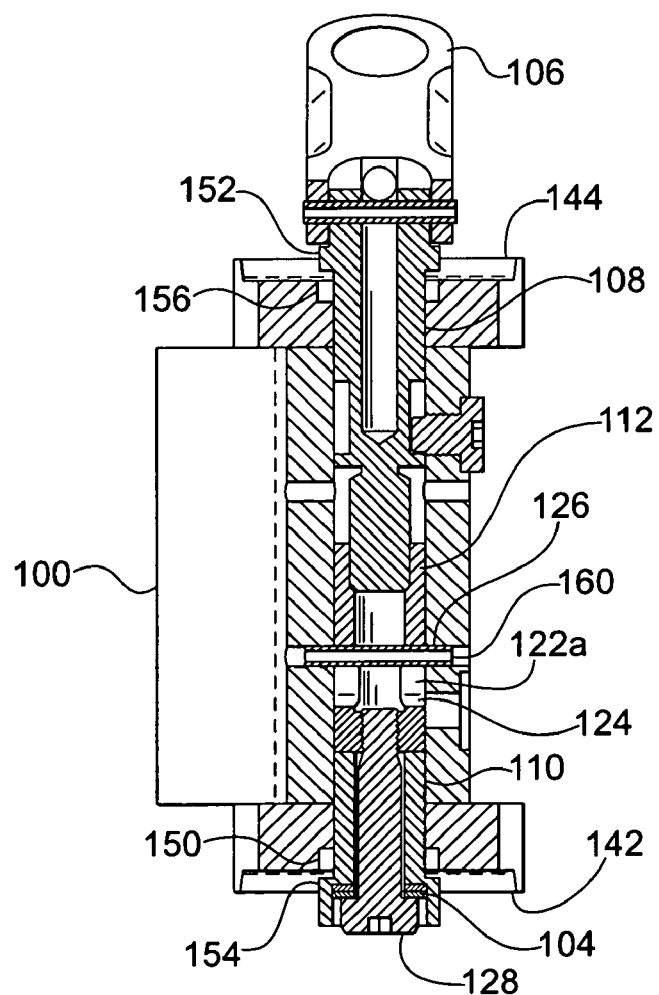
FIG. 10B is a sectional view of the object depicted in FIG. 10A taken along broken lines labeled A with the arrows indicating the direction of sight of the present invention.

With reference to FIG. 10A, finger member 100 is shown opened and mated with a gripper 140. The gripper 140 having arms 142 and 144. In FIG. 10B, a cross section as previously described with regards to FIG. 9B, with like numbers for like parts is shown. The gripper arm 140 is mated with sleeve 110 and gripper arm 144 is mated with pin 108. The flanges 150 and 152 are aligned with the recessed areas of the gripper arms 154 and 156. The washer 104 remains primarily uncompressed.

With reference to FIG. 11A, finger member 100 is shown opened and mated with a gripper 140. The gripper 140 having arms 142 and 144. In FIG. 10B, a cross section as previously described with regards to FIG. 9B, with like numbers for like parts is shown.

The finger member 100 and gripper 140 are mated and engagement begins with rotation of the locking lever 106 clockwise about the axis. As rotation begins, the locking lever 106 turns the pin 108. As the pin 108 is rotated, threaded members 134 along the outside surface are threadably connected to threads 118 along the inner surface of connector 112. The threaded connection can cause connector 112 to rotate coincident with pin 108. As the connector rotates, it hits a roll pin 160 positioned between a slotted surface 122A and 122B which causes the sleeve to stop rotation. The pin 108 is then threaded into the connector 112. As it is threaded, the pin 108 is displaced vertically into finger member 100, with flanged surface 152 mating 156. Further rotation, rotates the mated pin 108 and connector 112, pulling the connector 112 and sleeve 110 connected to the sleeve by the shoulder bolt 128 until the slotted surface 126 of connector 112 hits the retaining pin 160 which blocks further vertical movement of connector 112. As rotation continues, the pin 108 now finally finishes entering the connector and the flanged surface 152 mates entirely with recess 144. After the sleeve 110 and pin 108 are fully engaged, or bottomed out, the washer 104 gives the lever more compliance. Therefore, the lever 106 can be further turned which causes the recessed surface 154 to resist the flanged surface 150. This resistance in turn 108 to pull the connector 112 which in turn pulls the shoulder bolt 128. As the bolt 128 is pulled, it causes the washer 104 to be compressed between the surface 136 of bolt 128 and the surface 138 of sleeve 110. This compression in the washer 104 can cause a gap 170 between the connector 112 and first wall 120 of the sleeve 110. This gap is the space equal to the compliance in the washer 104 and equates to extra torque in the locking lever 106. The extra torque 106 gives the lever rotational free play in order to turn the lever enough to lock the assembly and also mate the locking lever 106 with the head of the pillar. When turning the lever 106, the bottoming out at the washer means that there is always enough torque to get at least another turn of the lever 106. Without the washer, the lever is one for one rotation. In another embodiment, the lever can be altered to give additional free play. By changing the pin connecting the lever to the locking bar, an additional 180 degrees of free play can be attained. When disengaging, first the lever will swing and additional 180 degrees and then the rotation of the locking bar will start.

With reference to FIG. 12, a quick-change assembly adapted to provide multiple quick-change assemblies in a tool for load balancing or adapting certain types of fingers and certain types of grippers. A parallel gripper 180 is shown having multiple fingers 182 and 184.

Figure 13:
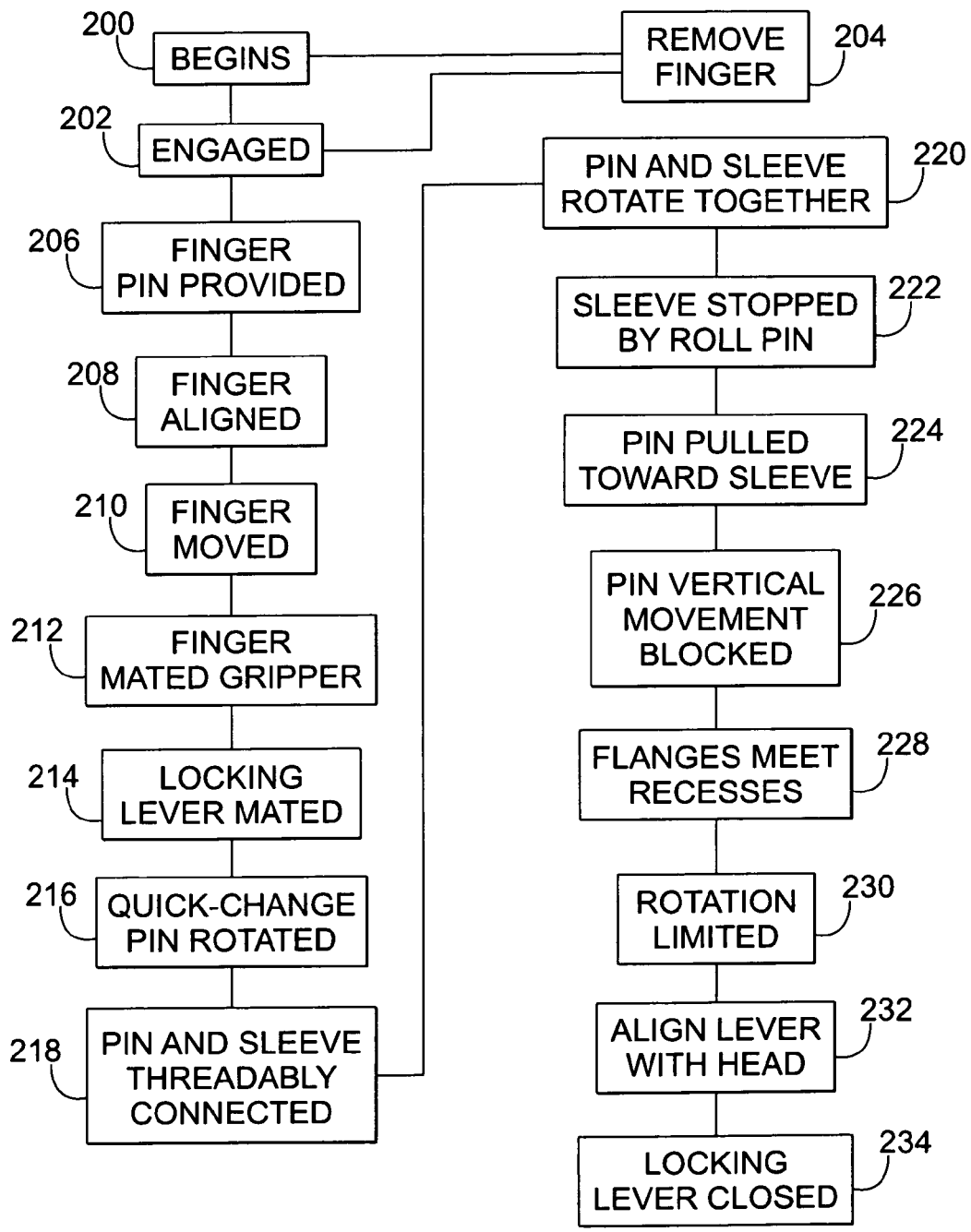
FIG. 13 is a flow diagram showing method steps in accordance with the present invention.

With reference to FIG. 13, a method of changing a finger assembly begins with block 200. At conditional block 202, if the quick-change mechanism 2 is engaged, then process flows to block 204, otherwise, the quick-change mechanism 2 is disengaged at block 206. At block 204 the finger member 4 is removed from the gripper 6, gripper 6 already attached to a robot is ready for a new finger member 4, process flows to block 200, to begin installation of the finger member 2. At block 206, a new finger member 4 is provided. Next, the provided finger member 4 is placed adjacent gripper 6 and aligned at block 208. At block 210, the finger member 4 is moved toward gripper 6. With the movement, finger member 4 is displaced into a mated position with the gripper 6 at block 212. In mated position, the gripper bar 10 of gripper 6 is received by passageway 34 of finger body 30 and the locking bar 37 is received by circular cavities 14 and 18. Mating of the finger body 30 to the gripper arms 8 and 9 is eased and guided by the rounded edges of the lips 16A and 16B of circular cavity 14 and the rounded edges of the surfaces 20A and 20B of cavity 18. Likewise, the smoothed lips 36A and 36B of passageway 34, guide and facilitate the mating with the gripper bar 10.

At conditional block 214, the finger member 4 and gripper 6 are mated and engagement begins with rotation of the locking lever 38 clockwise about the axis of locking bar 37. The direction is a function of the threads inside the assembly and is not meant to be limiting. As rotation begins, the locking lever 38 turns the quick-change pin 42 at block 216. As the quick-change pin 42 is rotated, threaded members along the outside surface are threadably connected to threads along the inner surface of sleeve 44 at block 218. The threaded connection causes sleeve 44 to rotate with pin 42 at block 220. As the sleeve 44 rotates, it hits a roll pin 58 lodged between a first and second slotted surface 62 and 64 which causes the sleeve to stop rotation. The pin 42 is pulled toward the sleeve 44. The pin 42 is displaced vertically into the passage 40 through the finger member 4 until it hits the upper wall of slotted surface 54 which blocks further vertical movement of pin 42 at block 226. As rotation continues, the pin 42 rotating around sleeve 44 now pulls the sleeve 44 into passage 40 at block 228. As the sleeve is pulled, the flanged surfaces 47 and 48 are pulled into recesses 46 and 50 in arms 8 and 9 at block 228. The locking lever 38 is rotated until a spring 90 between flange surface 48 and recess 50 is compressed and the locking lever 38 rotation is limited and tight. Also the locking lever 38 is rotationally adjusted in order to make the locking lever 38 align with the head 12 of the gripping bar 10. A spring can be alternately used to accord free play in the lever when adjusting. At block 234, the locking lever 38 is closed, by positioning the locking lever 38 onto the head 12 until the locking pin 42 therein locks on a grooved surface of the head 12.

To remove, the locking lever 38 is lifted from head 12. Locking lever 38 is rotated about the axis of locking bar 37 in a counterclockwise direction. The pin 42 is displaced from the sleeve 44 causing flanged surface 47 to exit the recess 50 until the pin 42 reaches a wall of the slotted surface 54. Then, the sleeve 44 is pushed outward from the passage 40 of finger body 30. The flanged surfaces 47 and 48 at both ends of locking bar 37 are moved outward from the gripper arms 8 and 9. The finger member 4 is displaced from the gripper 6.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

The invention claimed is:

1. An assembly for releasably connecting a gripper finger to a robotic arm comprising:
   a gripper having a first and second arm and a gripper bar, a cylindrical bar connecting said arms, said arms having parallel circular cavities, said parallel circular cavities having an opening, said opening defining a first and second lip; and
   a finger member comprising a finger and a body, said body having a locking lever connected to a locking bar extending through said finger member, and a cylindrical cavity, said cylindrical cavity defined by a longitudinal passageway along the length of the cavity, said passageway defining a first and second lip,
   wherein said gripper bar mates with said passageway of said cylindrical cavity of said finger member and said openings of arms of said gripper receiving said locking bar, wherein said locking lever is rotated and clamps said gripper to said finger member.

2. The assembly of claim 1, wherein the gripper bar comprises a head and a shaft.

3. The assembly of claim 2, further comprising:

a retaining member extending into a cylindrical cavity on an end of said locking lever; and a groove in said head of said gripper bar, wherein said retaining member engages said groove to lock said locking bar when said locking lever is positioned on the head.

4. The assembly of claim 3, wherein said head is a threaded retaining pin, said locking lever having a cavity having a threaded surface for threadably receiving said threaded retaining pin.

5. The assembly of claim 1, wherein said locking bar comprises:

a pin having a flanged first end and a second end, said locking lever rotatably connected to said flanged first end of said pin, said second end of said pin having a threaded surface; and a sleeve having an axial bore extending therethrough and a flanged second end, said axial bore having a threaded surface, wherein said threaded surface of said bore of said sleeve is threadably connected to said threaded surface of said second end of said pin.

6. The assembly of claim 5, further comprising:

a slotted surface between said pin and said finger body formed of a recess extending radially about the circumference of said pin, said recess having a first and second wall; and a hole through said body of said finger member aligned with said slotted surface for receiving a member, wherein said member is received by said hole through said gripper and into said slotted surface, said first and second wall limiting vertical movement of said pin.

7. The assembly of claim 5, further comprising:

a roll pin;

a slotted surface of said sleeve, said slotted surface defining an opening formed partially along the length and extending radially through the sleeve; and a hole through said body of said finger member in alignment with said slotted surface of said sleeve, wherein said roll pin is received by said hole and displaced through said finger member through said slotted surface into said finger member, said slotted surface of said sleeve interacting with said roll pin to limit rotational and vertical movement of said sleeve.

8. The assembly of claim 1, further comprising a spring positioned between said recess and said flanged surface of said sleeve, said spring for adjusting the locking bar and locking lever during engagement.

9. The assembly of claim 1, wherein the locking lever and locking bar limit longitudinal rotation of said finger about the gripper.

10. The assembly of claim 1, wherein the gripper arms limit vertical rotation of said finger.

11. The assembly of claim 1, wherein the gripper bar and locking bar limit lateral rotation of said finger.

12. The assembly of claim 1, wherein surfaces of said longitudinal passageway of said cylindrical cavity of said finger member are smoothed surfaces for sliding the gripper bar into alignment.

13. The assembly of claim 1, wherein said first and second lip of said gripper arm cavities are chamfered for directing alignment.

\* \* \* \* \*